US012625910B2

(12) United States Patent
Bi et al.

(10) Patent No.: US 12,625,910 B2
(45) Date of Patent: May 12, 2026

(54) HAND-DRAWING SHAPE-BASED DOCUMENT RETRIEVAL

(71) Applicant: Microsoft Technology Licensing, LLC, Redmond, WA (US)

(72) Inventors: Ran Bi, Beijing (CN); Yingxia Li, Redmond, WA (US); Yuwang Wang, Redmond, WA (US); Xiaoyi Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/715,595

(22) PCT Filed: Nov. 23, 2022

(86) PCT No.: PCT/US2022/050834
§ 371 (c)(1),
(2) Date: May 31, 2024

(87) PCT Pub. No.: WO2023/146625
PCT Pub. Date: Aug. 3, 2023

(65) Prior Publication Data
US 2025/0156482 A1     May 15, 2025

(30) Foreign Application Priority Data
Jan. 27, 2022     (CN) .......................... 202210100572.1

(51) Int. Cl.
*G06F 17/00* (2019.01)
*G06F 7/00* (2006.01)
(Continued)

(52) U.S. Cl.
CPC ........ *G06F 16/93* (2019.01); *G06F 16/24578* (2019.01); *G06F 16/901* (2019.01);
(Continued)

(58) Field of Classification Search
CPC .. G06F 16/93; G06F 16/901; G06F 16/24578; G06V 30/418; G06V 10/7715;
(Continued)

(56) References Cited

U.S. PATENT DOCUMENTS 6,917,709 B2 * 7/2005 Zelinski ............. G06V 30/2268
                                                      707/E17.022
8,306,982 B2 * 11/2012 Audet ................... G06F 16/958
                                                      707/738
(Continued)

FOREIGN PATENT DOCUMENTS

CN          108595636 A      9/2018
CN          109145140 A      1/2019
(Continued)

OTHER PUBLICATIONS

Bui, et al., "Sketching Out the Details: Sketch-Based Image Retrieval Using Convolutional Neural Networks with Multi-Stage Regression", Computer & Graphics, 2018, 15 pages.
(Continued)

*Primary Examiner* — Pavan Mamillapalli
(74) *Attorney, Agent, or Firm* — Schwegman Lundberg & Woessner, P.A.

(57) ABSTRACT

The present disclosure provides methods, apparatuses and computer program products for hand-drawing shape-based document retrieval. An input hand-drawing shape may be obtained. A hand-drawing shape feature of the hand-drawing shape may be extracted through a feature extracting model. At least one target document may be retrieved by using the hand-drawing shape feature and a feature index library associated with a plurality of candidate documents, at least one document page in the target document locally matching the hand-drawing shape.

20 Claims, 11 Drawing Sheets

(51) Int. Cl.

| | |
|---|---|
| *G06F 16/2457* | (2019.01) |
| *G06F 16/901* | (2019.01) |
| *G06F 16/93* | (2019.01) |
| *G06V 10/32* | (2022.01) |
| *G06V 10/46* | (2022.01) |
| *G06V 10/74* | (2022.01) |
| *G06V 10/75* | (2022.01) |
| *G06V 10/77* | (2022.01) |
| *G06V 10/774* | (2022.01) |
| *G06V 10/82* | (2022.01) |
| *G06V 30/418* | (2022.01) |

(52) U.S. Cl.
CPC .............. *G06V 10/32* (2022.01); *G06V 10/46* (2022.01); *G06V 10/757* (2022.01); *G06V 10/761* (2022.01); *G06V 10/7715* (2022.01); *G06V 10/774* (2022.01); *G06V 10/82* (2022.01); *G06V 30/418* (2022.01)

(58) Field of Classification Search
CPC ...... G06V 10/761; G06V 10/32; G06V 10/82; G06V 10/757; G06V 10/774; G06V 10/46
USPC ......................................................... 707/728
See application file for complete search history.

(56) References Cited

U.S. PATENT DOCUMENTS

| | | | | |
|---|---|---|---|---|
| 8,977,953 | B1 * | 3/2015 | Pierre ................... | G06F 40/289 |
| | | | | 715/201 |
| 9,507,805 | B1 | 11/2016 | Chechik | |
| 2002/0165873 | A1 * | 11/2002 | Kwok ................ | G06V 30/2272 |
| | | | | 715/268 |
| 2010/0177967 | A1 * | 7/2010 | Lee ......................... | G06F 16/50 |
| | | | | 382/218 |
| 2011/0307499 | A1 * | 12/2011 | Elias ....................... | G06F 16/34 |
| | | | | 707/750 |
| 2014/0169683 | A1 | 6/2014 | Wang | |
| 2020/0279097 | A1 * | 9/2020 | Bessenecker ........ | G09B 29/106 |
| 2020/0364259 | A1 * | 11/2020 | Kang ................... | G06N 3/0464 |
| 2021/0382605 | A1 * | 12/2021 | Edwards ................. | G06N 3/09 |
| 2022/0342928 | A1 * | 10/2022 | Flagg ................... | G06V 10/761 |
| 2023/0015050 | A1 * | 1/2023 | Ogura ................... | G06V 10/772 |

FOREIGN PATENT DOCUMENTS

| | | |
|---|---|---|
| EP | 0791883 B1 | 8/1997 |
| JP | 4752628 B2 | 12/2007 |

OTHER PUBLICATIONS

Cao, et al., "Edgel Index for Large-Scale Sketch-based Image Search", In Proceedings of Computer Vision and Pattern Recognition, Jun. 20, 2011, pp. 761-768.

Funkhouser, et al., "A Search Engine for 3D Models", n Journal of ACM Transactions on Graphics, vol. 22, Issue No. 1, Jan. 1, 2023, pp. 83-105.

International Search Report and Written Opinion received for PCT Application No. PCT/US22/050834, Mar. 1, 2023, 10 pages.

Sousa, et al., "Geometric matching for clip-art drawing retrieval", In Journal of Visual Communication and Image Representation, vol. 20, Issue No. 2, Feb. 1, 2009, pp. 71-83.

Sousa, et al., "Sketch-Based Retrieval of Drawings using Spatial Proximity", In Journal of Visual Languages and Computing, vol. 21, Issue No. 2, Apr. 1, 2010, pp. 69-80.

Notice of first examination opinion received for Chinese Application No. 202210100572.1, mailed on Dec. 19, 2025, 19 Pages (English Translation Provided).

* cited by examiner

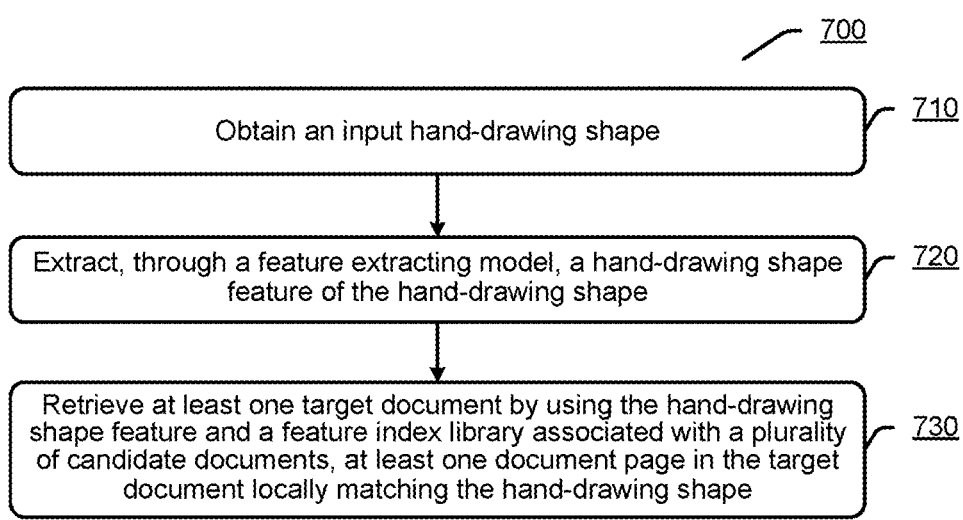

700

710 — Obtain an input hand-drawing shape

720 — Extract, through a feature extracting model, a hand-drawing shape feature of the hand-drawing shape 730 — Retrieve at least one target document by using the hand-drawing shape feature and a feature index library associated with a plurality of candidate documents, at least one document page in the target document locally matching the hand-drawing shape

FIG 7

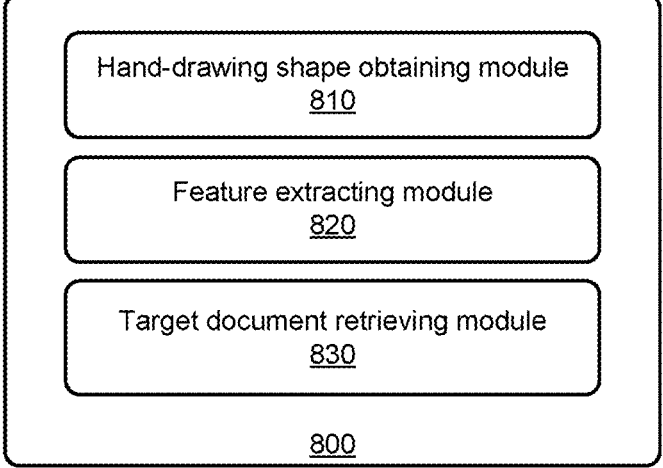

Hand-drawing shape obtaining module
810

Feature extracting module
820

Target document retrieving module
830

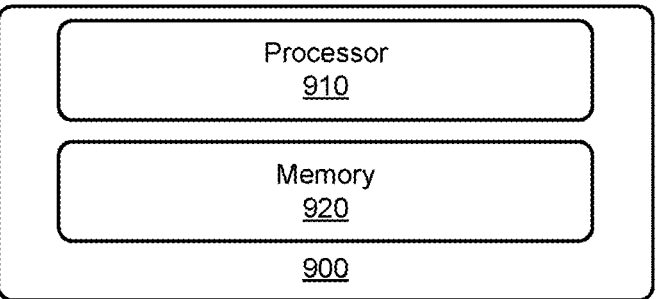

Processor
910

Memory
920

HAND-DRAWING SHAPE-BASED DOCUMENT RETRIEVAL

CROSS-REFERENCE TO RELATED APPLICATION

This application is a U.S. National Stage Filing under 35 U.S.C. 371 of International Patent Application Serial No. PCT/US2022/050834, filed Nov. 23, 2022, and published as WO 2023/146625 A1 on Aug. 3, 2023, which claims priority to Chinese Application No. 202210100572.1, filed Jan. 27, 2022, which applications and publication are incorporated herein by reference in their entirety.

BACKGROUND

Users of various computing environments may desire to retrieve or search for information or content of interest through information retrieval services. For example, a user of an operating system may desire to find a specific document in local storage. Operating systems generally provide a document retrieval service for document retrieval so as to help users to find documents of interest locally. Moreover, for example, a network user may desire to use a search engine to find webpage content of interest on the network. A search engine may provide a search service to return search results in response to search queries from users. Some search engines may provide an image search service for image retrieval, which can return image search results matching an input image based on the input image provided by a user.

SUMMARY

This Summary is provided to introduce a selection of concepts that are further described below in the Detailed Description. It is not intended to identify key features or essential features of the claimed subject matter, nor is it intended to be used to limit the scope of the claimed subject matter. Embodiments of the present disclosure propose methods, apparatuses and computer program products for hand-drawing shape-based document retrieval. An input hand-drawing shape may be obtained. A hand-drawing shape feature of the hand-drawing shape may be extracted through a feature extracting model. At least one target document may be retrieved by using the hand-drawing shape feature and a feature index library associated with a plurality of candidate documents, at least one document page in the target document locally matching the hand-drawing shape. It should be noted that the above one or more aspects comprise the features hereinafter fully described and particularly pointed out in the claims. The following description and the drawings set forth in detail certain illustrative features of the one or more aspects. These features are only indicative of the various manners in which the principles of various aspects may be employed, and this disclosure is intended to include all such aspects and their equivalents.

BRIEF DESCRIPTION OF THE DRAWINGS

The disclosed aspects will hereinafter be described in conjunction with the appended drawings that are provided to illustrate and not to limit the disclosed aspects.

FIG. 7 illustrates a flowchart of an exemplary method for hand-drawing shape-based document retrieval according to an embodiment.

FIG. 8 illustrates an exemplary apparatus for hand-drawing shape-based document retrieval according to an embodiment.

FIG. 9 illustrates an exemplary apparatus for hand-drawing shape-based document retrieval according to an embodiment.

DETAILED DESCRIPTION

Figure 1:
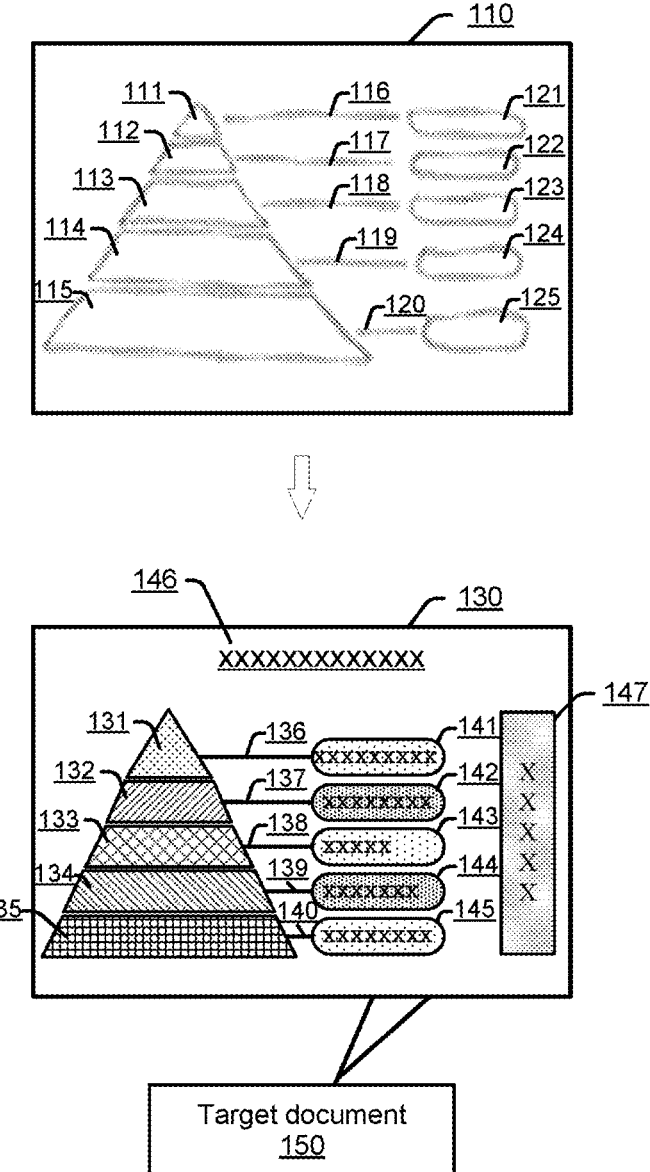
FIG. 1 illustrates an example of a hand-drawing shape and a document page image according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Generally, a document retrieval service provided by an operating system may receive a keyword input by a user and return a list of documents containing the keyword. Such document retrieval service usually can only support keyword-based document retrieval, but cannot support image retrieval, i.e., cannot support performing document retrieval based on input images. Moreover, generally, an image search service provided by a search engine may receive an input image uploaded by a user as a search query, then search for an image matching the input image on the network, and provide a search result that contains the searched image or a link to it. Such image search service is based on image global matching, which aims to find an image that is exactly the same or as similar as possible to the input image, e.g., the entirety of the searched image should be the same as or as similar as possible to the entirety of the input image.

Embodiments of the present disclosure propose a document retrieval mechanism which is based on hand-drawing shape. In response to a hand-drawing shape input by a user, the embodiments of the present disclosure may retrieve or search for a target document associated with the input hand-drawing shape locally or on the network, wherein the target document may refer to a document that meets the user's search intent and that the user expects to find. At least one document page in the target document will locally match the input hand-drawing shape, e.g., a document page image corresponding to the document page locally matches the hand-drawing shape. The embodiments of the present disclosure may retrieve the document page of the target document through the approach of image locally matching. The document page image corresponding to the retrieved document page only needs to locally match the hand-drawing shape, but does not need to globally match the hand-drawing shape, e.g., the document page image may include image elements that match the hand-drawing shape and potentially other image elements that are not depicted by the hand-drawing shape. Herein, a document may broadly refer to various electronic documents created by various applications, e.g., productivity tool documents created by productivity tool software, etc. Various image elements in a document page image may correspond to elements that are created in a corresponding document page via the applications or elements that are obtained in any other approaches by the applications and added into a corresponding document page.

The hand-drawing shape-based document retrieval mechanism proposed by the embodiments of the present disclosure performs a local matching-based cross-modal document page image retrieval task. Feature distribution of a hand-drawing shape is different from feature distribution of a document page image, thus a hand-drawing shape and a document page image belong to different modalities. Since a hand-drawing shape is drawn by a user, a hand-drawing shape has abstractness and vagueness, as compared to corresponding image elements in a document page image, e.g., a hand-drawing shape may be vague, inexact, schematic, etc. Moreover, unlike those traditional cross-modal image retrieval tasks, the embodiments of the present disclosure do not need to perform global matching between a hand-drawing shape and a document page image, but only require that a retrieved document page image locally matches a hand-drawing shape. In order to effectively solve the higher task complexity caused by characteristics of local matching and traits of hand-drawing shape as described above, the embodiments of the present disclosure may adopt at least a previously-trained feature extracting model for performing local matching-based cross-modal document image search task, wherein the feature extracting model may be trained for efficiently extracting features of a hand-drawing shape and a document page image to assist in local matching between the hand-drawing shape and the document page image. In some implementations, the feature extracting model may be a model that is based on deep convolutional neural network. In some implementations, the embodiments of the present disclosure also propose to perform data augmentation to training samples used for the feature extracting model, and train the feature extracting model at least with the augmented training samples. The data augmentation may effectively increase the number of training samples, improve the robustness of the trained feature extracting model, make the feature extracting model to be more focused on image local matching, improve the accuracy of retrieval task, etc.

In some application scenarios, a target document may be a personal document of a user, e.g., a document created, edited, received, browsed or saved by a user. In some cases, a user may only have a vague memory or understanding of a document to be retrieved, or it may be difficult for the user to accurately remember the exact file name of the document to be retrieved or words it contains, thus the user cannot accurately provide keywords corresponding to the document to be retrieved and further perform document retrieval based on keywords. However, shape or image elements in the document may be easier for the user to remember or recall, thus they may be used for helping the user to find the desired document. The embodiments of the present disclosure only require a user to draw a hand-drawing shape to depict an image element in a certain document page in a target document, so as to retrieve a document page that contains at least an image element matching the hand-drawing shape and the target document including the document page. In some implementations, a retrieval scope in which personal documents of a user are stored may be specified or predetermined by the user, and hand-drawing shape-based document retrieval would be performed within the retrieval scope, wherein the personal documents of the user may be stored in a local terminal and/or stored in a storage space on the network.

In some application scenarios, a target document may be a public document on the network, e.g., a document that contains specific image elements and is accessible on the network. A user may desire to find documents that contain certain image elements, even though these documents may be not personal documents of the user and may be unknown to the user. In this case, the user may provide a hand-drawing shape depicting a desired image element to a network search service such as a search engine, and the network search service may retrieve, in an open domain on the network, a document page at least containing an image element matching the hand-drawing shape and a target document including the document page, according to the embodiments of the present disclosure. Herein, an open domain may broadly refer to various content sources that exist on the network.

The embodiments of the present disclosure may be implemented in various approaches. For example, the hand-drawing shape-based document retrieval mechanism proposed by the embodiments of the present disclosure may be implemented as a new functional component of an operating system, implemented in an independent application, implemented as a new functional component in an existing application, implemented as a new functional component of a search engine, etc. In some implementations, the embodiments of the present disclosure may provide a user interface for interacting with a user. The user interface may be presented on a smart device used by a user. The user interface may include a canvas, so that a user may draw on the canvas to input a hand-drawing shape. The user interface may also include a retrieval result region for presenting a retrieval result about retrieved document pages or target documents to a user. Herein, the smart device may include various computing devices that have abilities of data processing, information presenting, etc., and are operable by users, e.g., desktop computer, laptop computer, tablet computer, smart phone, etc. The smart device may have various components or functions that support the user to draw hand-drawing shapes, e.g., support the user to draw shapes on the canvas through a touch screen, support the user to draw shapes on the canvas by using peripherals such as a stylus pen, etc.

FIG. 1 illustrates an example of a hand-drawing shape and a document page image according to an embodiment.

It is assumed that a hand-drawing shape 110 is drawn by a user. The hand-drawing shape 110 may include a plurality of shape elements, e.g., a triangle-like shape element 111, trapezoid-like shape elements 112 to 115, straight line-like shape elements 116 to 120, ellipse-like shape elements 121 to 125, etc. It should be understood that since the hand-drawing shape 110 is manually drawn by the user, the shape elements included in the hand-drawing shape 110 may be not standard shapes, e.g., not standard triangles, trapezoids, straight lines, ellipses, etc., although the user may have intended to draw these standard shapes.

It is assumed that a target document 150 associated with the hand-drawing shape 110 is determined by performing hand-drawing shape-based document retrieval according to the embodiments of the present disclosure, wherein a document page in the target document 150 locally matches the hand-drawing shape 110. A document page image 130 corresponds to the document page, which is an image derived or generated from the document page through processing such as document format conversion. The document page image 130 may include a plurality of image elements, e.g., a triangle image element 131, trapezoid image elements 132 to 135, straight line image elements 136 to 140, ellipse image elements 141 to 145, a text image element 146, a rectangle image element 147, etc. It should be understood that, in FIG. 1 and subsequent figures, possible actual text is represented by the symbol "X", and different actual color information, e.g., tone, brightness, contrast, saturation, etc., is represented by different textures or grayscales filled in image elements and document page images.

As shown in FIG. 1, a portion of the image elements in the document page image 130 match the shape elements in the hand-drawing shape 110, e.g., outlines or lines of these image elements are visually similar to the shape elements in the hand-drawing shape 110. For example, outlines of the image elements 131 to 135 in the document page image 130 are visually similar to the shape elements 111 to 115 in the hand-drawing shape 110, lines of the image elements 136 to 140 in the document page image 130 are visually similar to the shape elements 116 to 120 in the hand-drawing shape 110, and outlines of the image elements 141 to 145 in the document page image 130 are visually similar to the shape elements 121 to 125 in the hand-drawing shape 110. Although the shape elements in the hand-drawing shape 110 cannot depict color information, the image elements in the document page image 130 corresponding to these shape elements may have individual color information. Moreover, the document page image 130 also includes image elements not depicted by the hand-drawing shape 110, e.g., the text image element 146 and the rectangle image element 147.

As can be seen from FIG. 1 that, a user only needs to simply draw a hand-drawing shape indicating a concerned or desired image element, and the embodiments of the present disclosure may retrieve a document page image which includes at least an image element matching the hand-drawing shape, and a document page and a target document corresponding to the document page image, thereby enabling the user to access the target document.

It should be understood that all the elements shown in FIG. 1 are exemplary, and depending on specific application scenarios and requirements, there may be more obvious visual differences between image elements in a retrieved document page image and shape elements in a hand-drawing shape. Moreover, although it is shown in FIG. 1 that each graphical element in the hand-drawing shape 110 has a corresponding image element in the document page image 130, it is also possible that one or more shape elements in the hand-drawing shape 110 do not have corresponding image elements in the document page image 130.

Figure 2:
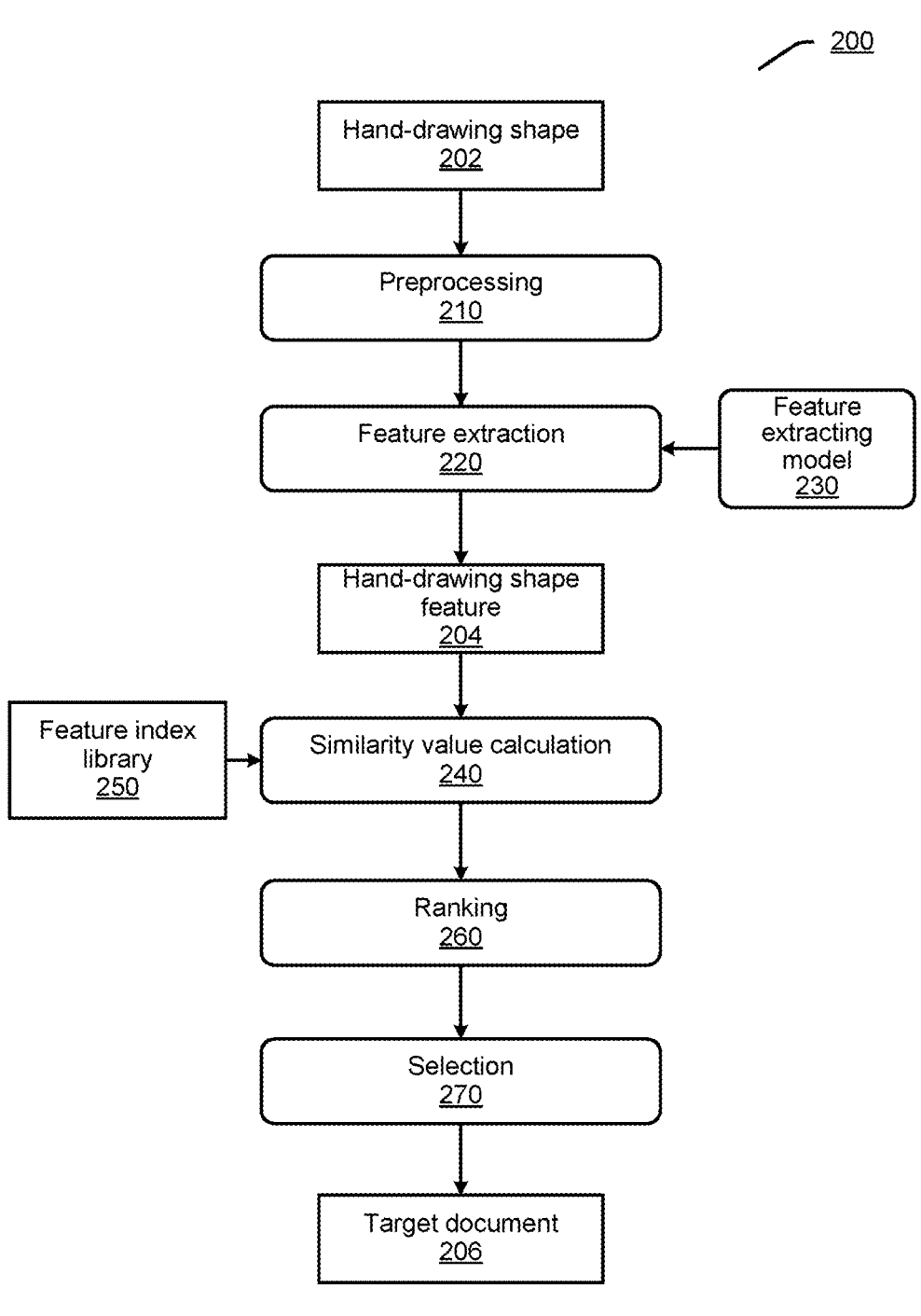
FIG. 2 illustrates an exemplary process for hand-drawing shape-based document retrieval according to an embodiment.

FIG. 2 illustrates an exemplary process 200 for hand-drawing shape-based document retrieval according to an embodiment.

According to the process 200, an input hand-drawing shape 202 may be obtained. For example, the hand-drawing shape 202 may be drawn by a user on a canvas in a user interface. Shape elements in the hand-drawing shape 202 indicate image elements that the user expects a retrieved target document to contain. For example, if the user wants to find a target document that contains three five-pointed stars, the user may try to draw three shapes similar to five-pointed stars on the canvas. Graphical elements drawn by the user may form the hand-drawing shape 202.

In the process 200, optionally, preprocessing may be performed to the hand-drawing shape 202 at 210. For example, through the preprocessing at 210, the hand-drawing shape 202 may be scaled to a predetermined size. The predetermined size may be a pre-specified standardized size, so that hand-drawing shapes of different sizes may be uniformly standardized to the predetermined size. In an implementation, a feature extracting model involved in the subsequent steps may be trained at least with respect to hand-drawing shape samples in the predetermined size, thus the preprocessing at 210 will facilitate to improve the performance and processing effects of the feature extracting model.

At 220, a hand-drawing shape feature 204 of the hand-drawing shape 202 may be extracted. In an implementation, the hand-drawing shape feature 204 of the hand-drawing shape 202 may be extracted through a feature extracting model 230. Optionally, if preprocessing was performed to the hand-drawing shape 202 at 210, the feature extracting operation at 220 may include extracting a hand-drawing shape feature of the preprocessed hand-drawing shape, e.g., extracting a hand-drawing shape feature of the preprocessed hand-drawing shape through the feature extracting model 230.

In an implementation, the feature extracting model 230 may be based on deep convolutional neural network. For example, the feature extracting model 230 may include a sequence of feature extracting units and a final pooling layer that are connected in series. Parameter values of each feature extracting unit may be calculated during the training process by performing, e.g., a gradient descent algorithm on training samples. A feature extracting unit may include a convolutional calculation unit for performing sliding window calculation on an input image. The feature extracting model 230 will finally obtain a feature vector that corresponds to the input image and is used for characterizing image information. As an example, the deep convolutional neural network adopted by the feature extracting model 230 may be constructed based on residual structure, e.g., ResNet series network structure. Taking ResNet50 as an example, on the basis of the existing ResNet50 network, the embodiments of the present disclosure may add a maximum pooling layer in the last layer. The maximum pooling layer may perform maximum pooling, in the spatial dimensions, to a feature map extracted by the deep convolutional neural network, thereby the most prominent feature in the input image can be extracted.

The hand-drawing shape 202 or the preprocessed hand-drawing shape may be provided as an input image to the feature extracting model 230, so as to obtain a hand-drawing shape feature 204. For example, the hand-drawing shape feature 204 may be a feature vector that is generated by the feature extracting model 230 and used for characterizing image information in the hand-drawing shape.

According to the process 200, after the hand-drawing shape feature 204 is obtained, at least one target document may be retrieved by using the hand-drawing shape feature 204 and a feature index library associated with a plurality of candidate documents. At least one document page in the target document will locally match the hand-drawing shape 202. Exemplarily, retrieval of the target document may be implemented by, e.g., performing similarity value calculation at 240, performing ranking at 260, performing selection at 270, etc.

At 240, a similarity value between the hand-drawing shape feature 204 and each document page image feature in the feature index library 250 may be calculated.

According to the embodiments of the present disclosure, the process 200 may include pre-establishing the feature index library 250 associated with the plurality of candidate documents. Each candidate document may include one or more document pages. A document page image feature of a document page image corresponding to each document page may be previously extracted by, e.g., the feature extracting model 230, and a data item in the feature index library 250 may be formed by using the document page image feature and an index of the document page image. Accordingly, the feature index library 250 may comprise a plurality of data items respectively corresponding to a plurality of document page images. Each data item in the feature index library 250 may at least comprise: a document page image feature extracted from a document page image corresponding to a document page in a candidate document; and an index of the document page image. For example, the document page image feature may be a feature vector which is generated by the feature extracting model 230 and used for characterizing image information in the document page image.

In an implementation, the similarity value calculation at 240 may adopt cosine similarity, e.g., calculating a cosine similarity value between the hand-drawing shape feature 204 and a document page image feature. It should be understood that the embodiments of the present disclosure are not limited to calculate a similarity value based on the cosine similarity at 240, but may also adopt any other approaches for calculating a similarity value.

At 260, the plurality of document page images indexed in the feature index library 250 may be ranked based on similarity values. For example, the plurality of document page images may be ranked from high to low based on a similarity value between a document page image feature of each document page image and the hand-drawing shape feature.

At 270, at least one target document 206 may be selected based on the ranked document page images. For example, at least one candidate document corresponding to at least one highest-ranked document page image may be selected as the target document. In an implementation, a predetermined number may be preset for target documents selected at 270, and accordingly, a predetermined number of candidate documents corresponding to the predetermined number of highest-ranked document page images may be selected as the target documents.

It should be understood that all the steps in the process 200 in FIG. 2 are exemplary, and the embodiments of the present disclosure will also encompass any changes to the process 200. Moreover, although not shown, the process 200 may also include a training process for the feature extracting model 230.

Figure 3:
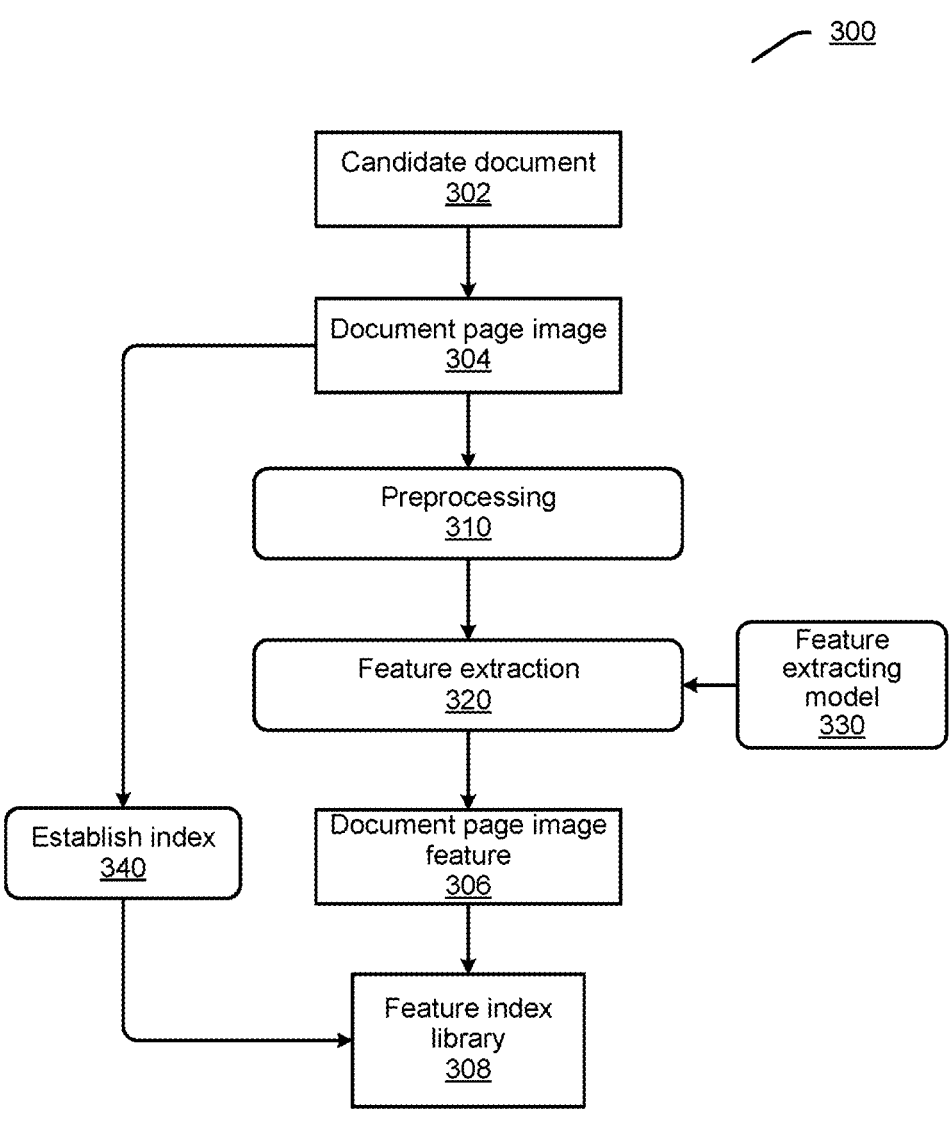
FIG. 3 illustrates an exemplary process for establishing a feature index library according to an embodiment.

FIG. 3 illustrates an exemplary process 300 for establishing a feature index library according to an embodiment.

The process 300 may be performed for establishing a feature index library for a plurality of candidate documents. In different application scenarios, candidate documents may have corresponding coverage. As an example, in an application scenario where a user desires to retrieve a personal document, candidate documents may be personal documents of the user. If the user specifies a specific retrieval scope of personal documents, candidate documents may be documents in the retrieval scope. For example, the retrieval scope may be a specific storage path, a folder directory, etc. As an example, in an application scenario where a user desires to retrieve public documents on the network through, e.g., a search engine, candidate documents may be documents previously collected in an open domain by a search engine service provider. Moreover, it should be understood that the embodiments of the present disclosure are not restricted to any limitations of specific storage locations of candidate documents, e.g., candidate documents may be local documents and/or network documents.

An exemplary candidate document 302 may include a group of document pages, e.g., one or more document pages. For each document page, a corresponding document page image may be derived or generated. The document page image is a presentation of the document page in an image format, and thus all elements in the document page will be converted into corresponding image elements in the document page image. Herein, the expression about "image elements in a document page" may broadly refer to image elements in a document page image corresponding to the document page. In an implementation, a corresponding document page image may be derived or generated from a document page through processing such as document format conversion, etc. It should be understood that the embodiments of the present disclosure are not restricted to any limitations of specific approaches of deriving or generating a document page image corresponding to a document page. For a group of document pages in the candidate document 302, a corresponding group of document page images may be obtained, and accordingly, the group of document page images will all correspond to the candidate document 302. It is assumed that a document page image 304 is an exemplary document page image in a group of document page images obtained for the candidate document 302.

In the process 300, optionally, preprocessing may be performed to the document page image 304 at 310. For example, through the preprocessing at 310, the document page image 304 may be scaled to a predetermined size. The predetermined size may be a pre-designated standardized size, so that document page images of different sizes may be uniformly standardized to the predetermined size. In an implementation, a feature extracting model involved in the subsequent steps may be trained at least with respect to document page image samples in the predetermined size, and thus the preprocessing at 310 will facilitate to improve the performance and processing effects of the feature extracting model. Optionally, the preprocessing at 310 and the preprocessing at 210 in FIG. 2 may adopt the same predetermined size.

At 320, a document page image feature 306 of the document page image 304 may be extracted. In an implementation, the document page image feature 306 of the document page images 304 may be extracted through a feature extracting model 330. Optionally, if preprocessing was performed to the document page image 304 at 310, the feature extracting operation at 320 may include extracting a document page image feature of the preprocessed document page image, e.g., extracting a document page image feature of the preprocessed document page image through the feature extracting model 330. The feature extracting model 330 may correspond to the feature extracting model 230 in FIG. 2.

At 340, an index may be established for the document page image 304. In an implementation, the established index may identify the document page image 304. Since the document page image 304 is associated with the candidate document 302, the candidate document 302 may then be found via the index. In an implementation, the operation of establishing an index at 340 may include simultaneously establishing an index for both the document page image 304 and the candidate document 302, e.g., the established index may identify both the document page image 304 and the candidate document 302.

According to the process 300, the index for the document page image 304 and the document page image feature 306 may be stored together into a feature index library 308. For example, the index for the document page image 304 and the document page image feature 306 may be stored in the feature index library 308 as a data item.

The process 300 may be performed separately for a group of document page images corresponding to the candidate document 302, so as to store a group of data items respectively corresponding to the group of document page images into the feature index library 308. Similarly, data items for other candidate documents in the plurality of candidate documents may be established in the feature index library 308.

It should be understood that all the steps in the process 300 in FIG. 3 are exemplary, and the embodiments of the present disclosure will also encompass any changes to the process 300.

Figure 4:
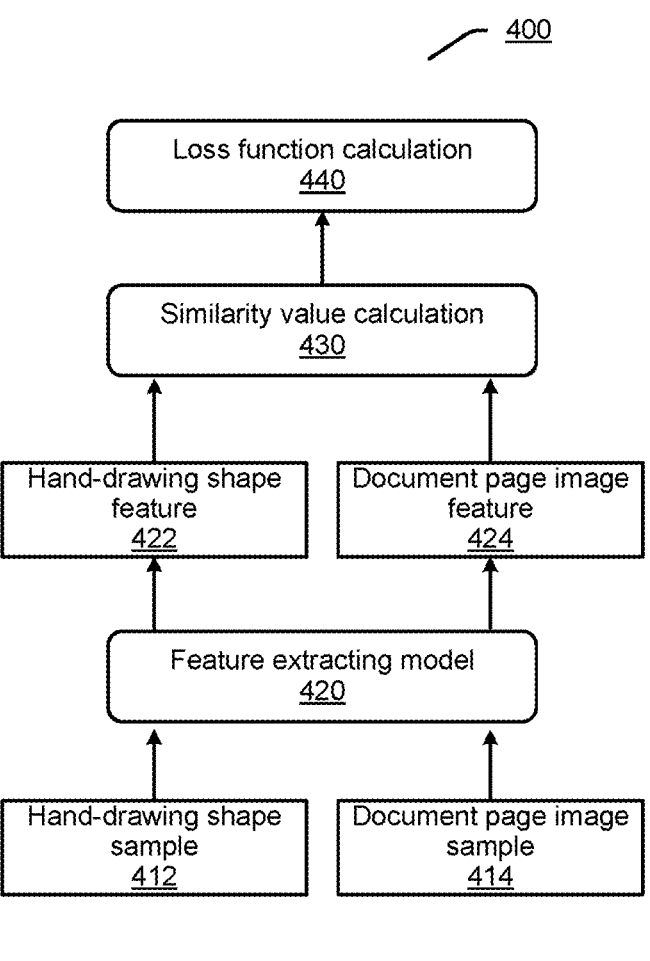
FIG. 4 illustrates an exemplary process for training a feature extracting model according to an embodiment.
Figure 4:
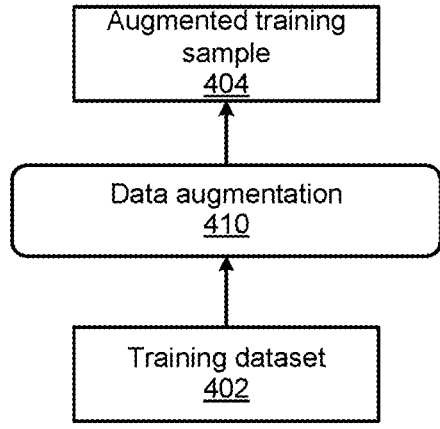

FIG. 4 illustrates an exemplary process 400 for training a feature extracting model according to an embodiment. The process 400 may be performed for training a feature extracting model 420 which may correspond to, e.g., the feature extracting model 230 in FIG. 2 and the feature extracting model 330 in FIG. 3. The feature extracting model 420 may be trained for generating a corresponding image feature for an input image. For example, if the input image is a hand-drawing shape, the feature extracting model 420 may generate a hand-drawing shape feature of the hand-drawing shape, and if the input image is a document page image, the feature extracting model 420 may generate a document page image feature for the document page image.

According to the process 400, the feature extracting model 420 may be trained by using a training dataset 402 comprising a group of training samples. Each training sample in the training dataset 402 may at least include, e.g., a hand-drawing shape sample, a document page image sample, a similarity label, etc. For a particular training sample, a similarity label in the training sample may be used for indicating an image local matching degree between a hand-drawing shape sample and a document page image sample in the training sample. Training samples in the training dataset 402 may include positive training samples and negative training samples. A hand-drawing shape sample and a document page image sample in a positive training sample will have image local matching and accordingly have higher similarity labels. A hand-drawing shape sample and a document page image sample in a negative training sample will have no image local matching and accordingly have lower similarity labels.

In the process 400, optionally, data augmentation may be performed to training samples in the training dataset 402 at 410, so as to obtain a plurality of augmented training samples 404. The augmented training samples 404 may be further added into the training dataset 402. The data augmentation at 410 may randomly change a hand-drawing shape sample and a document page image sample in a training sample, e.g., obtaining a transformed hand-drawing shape sample and a transformed document page image sample through changing pixels in the hand-drawing shape sample and the document page image sample. Various types of data augmentation may be adopted at 410, e.g., random cropping and scaling, random region erasing, random perspective converting, random color jittering, etc. The random cropping and scaling may refer to cropping and removing at least one region of a hand-drawing shape sample or a document page image sample, and scaling the remaining region to the original predetermined size through stretching. The random region erasing may refer to setting values of all pixels in at least one region in a hand-drawing shape sample or a document page image sample to 0. The random perspective converting may refer to changing the original perspective of a hand-drawing shape sample or a document page image sample to another perspective, wherein changing the perspective may include, e.g., rotating by a predetermined angle, adding a near-far effect, etc. The random color jittering may refer to changing color information, e.g., tone, brightness, contrast, saturation, etc., of a hand-drawing shape sample or a document page image sample. It should be understood that the embodiments of the present disclosure are not limited to the above exemplary types of data augmentation, but will encompass any type of data augmentation capable of randomly changing a hand-drawing shape sample and a document page image sample.

Data augmentation may be performed to a hand-drawing shape sample and a document page image sample in a training sample in different approaches, e.g., performing the same type of data augmentation respectively, performing different types of data augmentation respectively, performing the same combination of multiple types of data augmentations respectively, performing different combinations of multiple types of data augmentations respectively, etc., to the hand-drawing shape sample and the document page image sample. Thus, a plurality of augmented training samples may be obtained based on a training sample. Accordingly, through performing data augmentation, the number of training samples in the training dataset 402 may be effectively increased. An augmented training sample includes a transformed hand-drawing shape sample and a transformed document page image sample, and thus by using such augmented training sample to train the feature extracting model, robustness of the feature extracting model may be effectively improved, and the feature extracting model may be made to be more focused on image local matching. Moreover, the performance improvement of the feature extracting model brought by data augmentation may also further improve the accuracy of the entire retrieval task, e.g., the feature extracting model may extract hand-drawing shape sample features and document page image sample features more accurately, so that operations such as similarity value calculation, ranking, selection, etc. in FIG. 2 may be performed more accurately.

It is assumed that a hand-drawing shape sample 412 and a document page image sample 414 are from an exemplary training sample. This training sample may be an original training sample in the training dataset 402 or an augmented training sample. The feature extracting model 420 may extract a hand-drawing shape feature 422 of the hand-drawing shape sample 412 and a document page image feature 424 of the document page image samples 414. At 430, a similarity value between the hand-drawing shape feature 422 and the document page image feature 424 may be calculated. For example, the similarity value calculation at 430 may be similar to the similarity value calculation at 240 in FIG. 2. For different training samples in the training dataset 402, the feature extraction by the feature extracting model 420 and the similarity value calculation at 430 may be performed respectively.

At 440, loss function calculation may be performed. In an implementation, a triplet loss function may be used as an optimization target. Assuming that a is a hand-drawing shape sample feature of a hand-drawing shape sample, p is a document page image feature of a document page image sample in a positive training sample containing the hand-drawing shape sample, and n is a document page image feature of a document page image sample in a negative training sample containing the hand-drawing shape sample, then <a,p> constitutes a positive sample pair, and <a, n> constitutes a negative sample pair. The triplet loss function may be represented as L=max(d(a,p)−d(a,n)+margin, 0). L represents a loss. max is a maximum value function. d is a similarity value calculating function which may correspond to the similarity value calculation at 430, and d(a,p) is a similarity value of the positive sample pair <a,p> and may indicate the distance between the positive sample pair, d(a,n) is a similarity value of the negative sample pair <a, n> and may indicate the distance between the negative sample pair. margin represents a margin used for adjusting the difference between the similarity value of the positive sample pair and the similarity value of the negative sample pair. An optimization goal of the triplet loss function may be: increasing the similarity value of the positive sample pair <a,p> and thereby reducing the distance between the positive sample pair, and reducing the similarity value of the negative sample pair <a, n> and thereby increasing the distance between the negative sample pair, until the similarity value of the positive sample pair is larger than the similarity value of the negative sample pair by a value of margin.

According to the process 400, in the training of the feature extracting model 420, for example, a stochastic gradient descent (SGD) optimizer may be adopted as a training optimizer for performing gradient descent-based model parameter optimization. For example, the SGD optimizer may be configured for drawing out mini-batches of samples and performing parameter optimization by calculating an average gradient of samples in each mini-batch.

It should be understood that all the steps in the process 400 in FIG. 4 are exemplary, and the embodiments of the present disclosure will also encompass any changes to the process 400. For example, the data augmentation at 410 is optional, and the feature extracting model may also be trained by using the original training samples in the training dataset. For example, the embodiments of the present disclosure are not limited to adopt the triplet loss function, but may adopt any other loss functions.

FIG. 5A to FIG. 5F illustrate examples of data augmentation according to embodiments. Hand-drawing shape samples and document page image samples as well as augmented hand-drawing shape samples and document page image samples shown in FIG. 5A to FIG. 5F are all exemplary. Moreover, the embodiments of the present disclosure are not limited to the types of data augmentation involved in these examples, but will also encompass any other types of data augmentation.

Figure 5A:
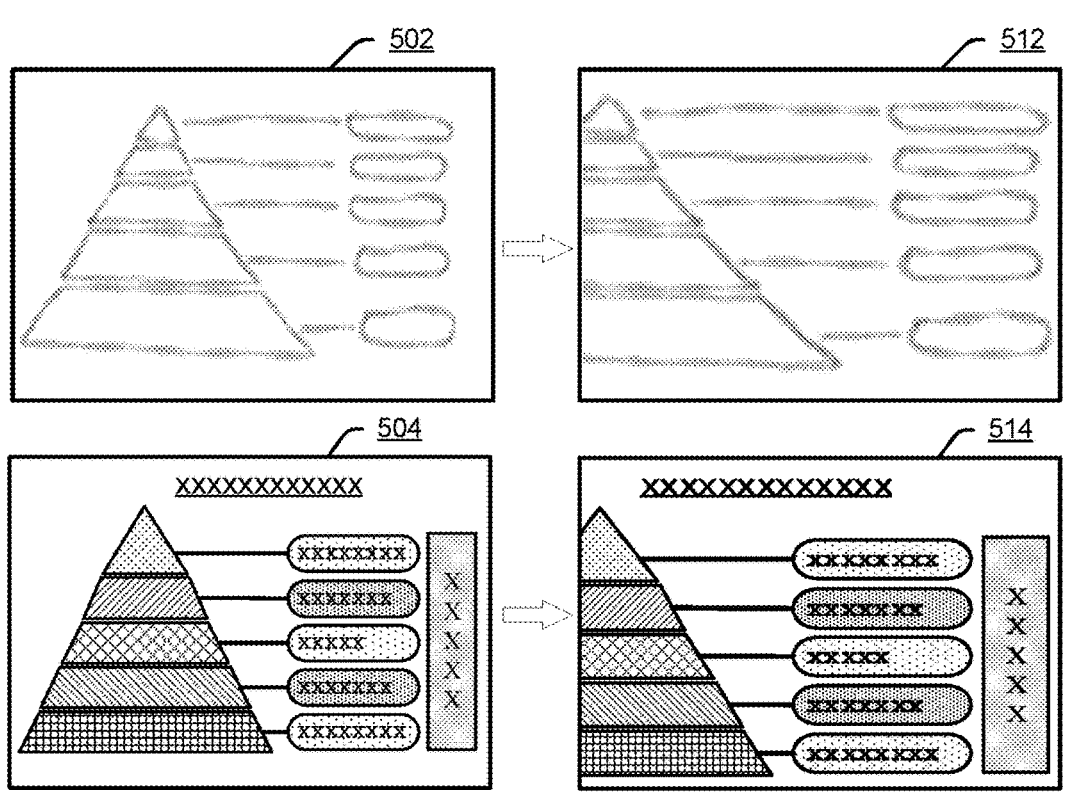
FIG. 5A to FIG. 5F illustrate examples of data augmentation according to embodiments.

FIG. 5A illustrates an example of data augmentation that is based on random cropping and scaling. It is assumed that a hand-drawing shape sample 502 and a document page image sample 504 are from the same training sample. An augmented hand-drawing shape sample 512 is obtained by performing random cropping and scaling to the hand-drawing shape sample 502. For example, a left region of the hand-drawing shape sample 502 is cropped and removed, and the remaining region is scaled to the original size of the hand-drawing shape sample 502, thereby the augmented hand-drawing shape sample 512 having the same size as the hand-drawing shape sample 502 is obtained. Similarly, an augmented document page image sample 514 is obtained by performing random cropping and scaling to the document page image sample 504. It should be understood that the cropped region in the hand-drawing shape sample 502 and the cropped region in the document page image sample 504 may have the same size or different sizes, the same position or different positions, etc.

Figure 5B:
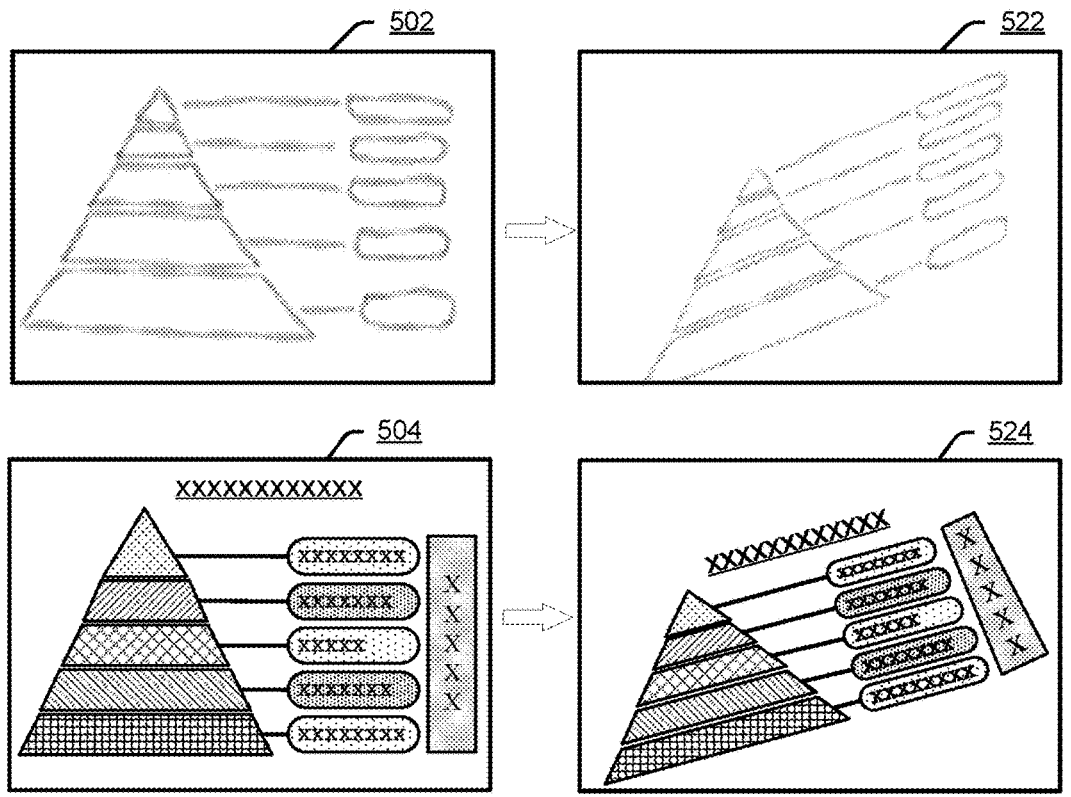

FIG. 5B illustrates an example of data augmentation that is based on random perspective converting. FIG. 5B still takes the hand-drawing shape sample 502 and the document page image sample 504 as examples. An augmented hand-drawing shape sample 522 is obtained by performing random perspective converting to the hand-drawing shape sample 502. For example, the hand-drawing shape sample 502 is rotated counter-clockwise by a predetermined angle and a near-far effect is added, thereby the augmented hand-drawing shape sample 522 is obtained.

Similarly, an augmented document page image sample 524 is obtained by performing random perspective converting to the document page image sample 504. It should be understood that random perspective converting may be performed to the hand-drawing shape sample 502 and the document page image sample 504 in the same approach or different approaches, e.g., by using the same rotation angle or different rotation angles, by using the same near-far effect or different near-far effects, etc.

Figure 5C:
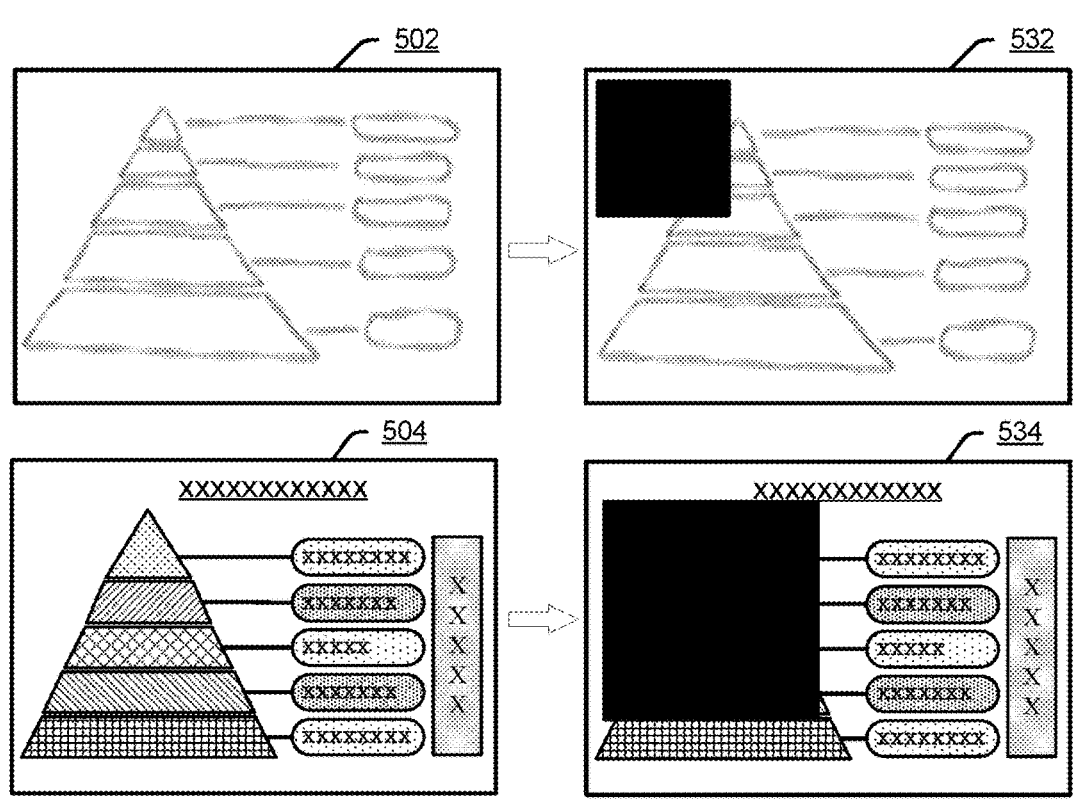

FIG. 5C illustrates an example of data augmentation that is based on random region erasing. FIG. 5C still takes the hand-drawing shape sample 502 and the document page image sample 504 as examples. An augmented hand-drawing shape sample 532 is obtained by performing random region erasing to the hand-drawing shape sample 502. For example, values of all pixels within a region in the hand-drawing shape sample 502 are set to 0, thereby the augmented hand-drawing shape sample 532 is obtained, wherein the erased region is shown as a black block in the augmented hand-drawing shape sample 532. Similarly, an augmented document page image sample 534 is obtained by performing random region erasing to the document page image sample 504, wherein the erased region is shown as a black block in the augmented document page image sample 534. It should be understood that the erased region in the hand-drawing shape sample 502 and the erased region in the document page image sample 504 may have the same size or different sizes, the same position or different locations, etc.

Figure 5D:
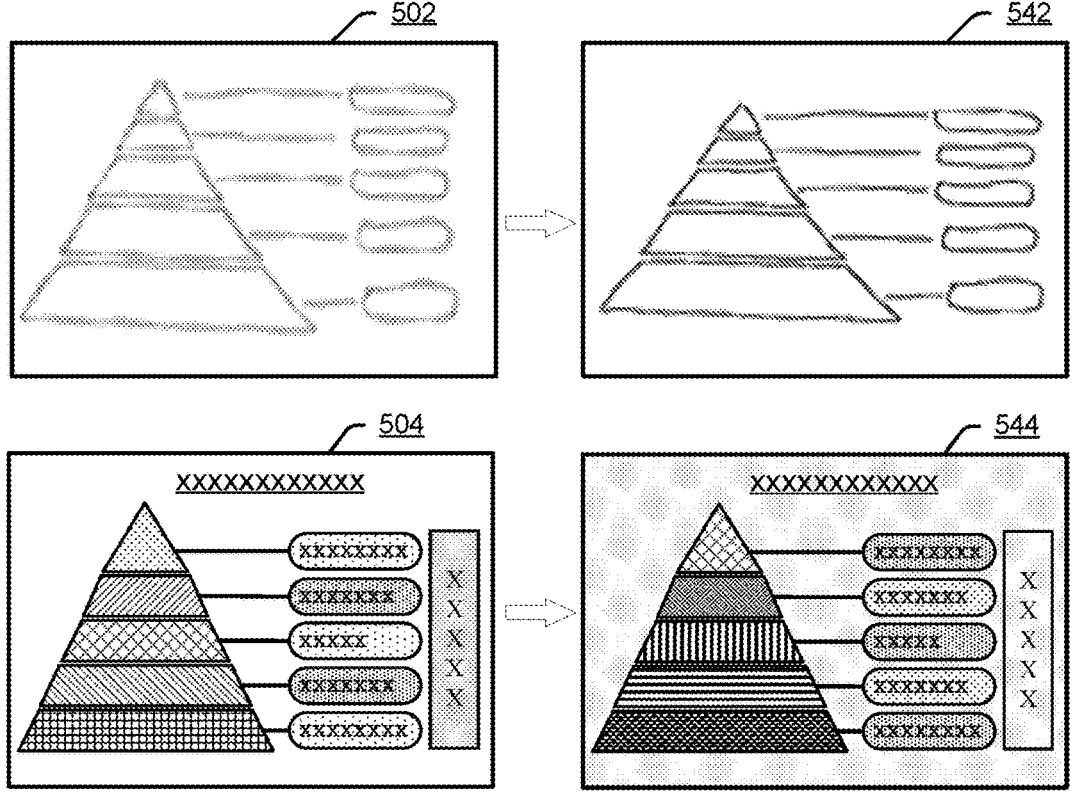

FIG. 5D illustrates an example of data augmentation that is based on random color jittering. FIG. 5D still takes the hand-drawing shape sample 502 and the document page image sample 504 as examples. An augmented hand-drawing shape sample 542 is obtained by performing random color jittering to the hand-drawing shape sample 502. For example, color information of the hand-drawing shape sample 502 may be changed, thereby the augmented hand-drawing shape sample 542 is obtained. Similarly, an augmented document page image sample 544 is obtained by performing random color jittering to the document page image sample 504. It should be understood that random color jittering may be performed to the hand-drawing shape sample 502 and the document page image sample 504 in the same approach or different approaches, e.g., by changing color information such as tone, brightness, contrast, saturation, etc., in the same approach or different approaches.

It is described above in connection with FIG. 5A to FIG. 5D that the same single type of data augmentation is performed to both the hand-drawing shape sample and the document page image sample simultaneously. It should be understood that the embodiments of the present disclosure may also simultaneously perform different single types of data augmentation to the hand-drawing shape sample and the document page image sample, respectively. Moreover, the embodiments of the present disclosure may also simultaneously perform the same or different combinations of multiple types of data augmentation to the hand-drawing shape sample and the document page image sample, respectively.

Figure 5E:
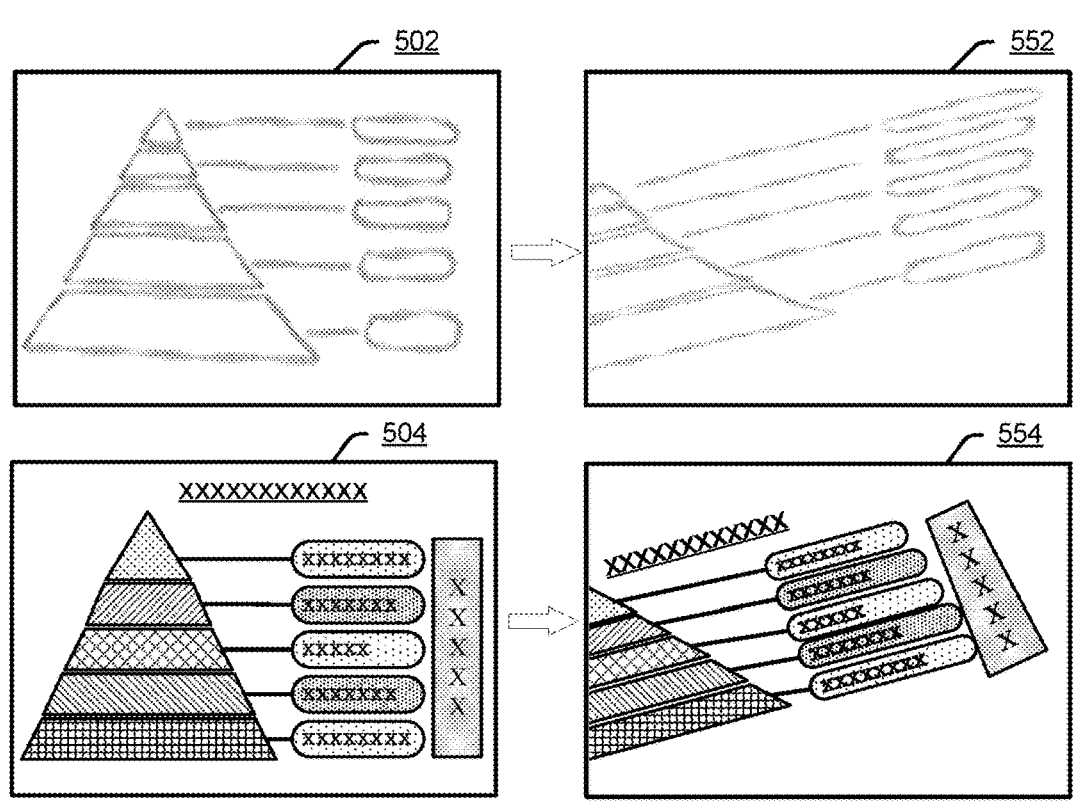

FIG. 5E illustrates an example of data augmentation combination. FIG. 5E still takes the hand-drawing shape sample 502 and the document page image sample 504 as examples. As shown in FIG. 5E, an augmented hand-drawing shape sample 552 is obtained by performing, e.g., random cropping and scaling, random perspective converting, etc., to the hand-drawing shape sample 502, and an augmented document page image sample 554 is obtained by performing, e.g., random cropping and scaling, random perspective converting, etc., to the document page image sample 504. In FIG. 5E, the same data augmentation combination is performed to both the hand-drawing shape sample and the document page image sample, respectively.

Figure 5F:
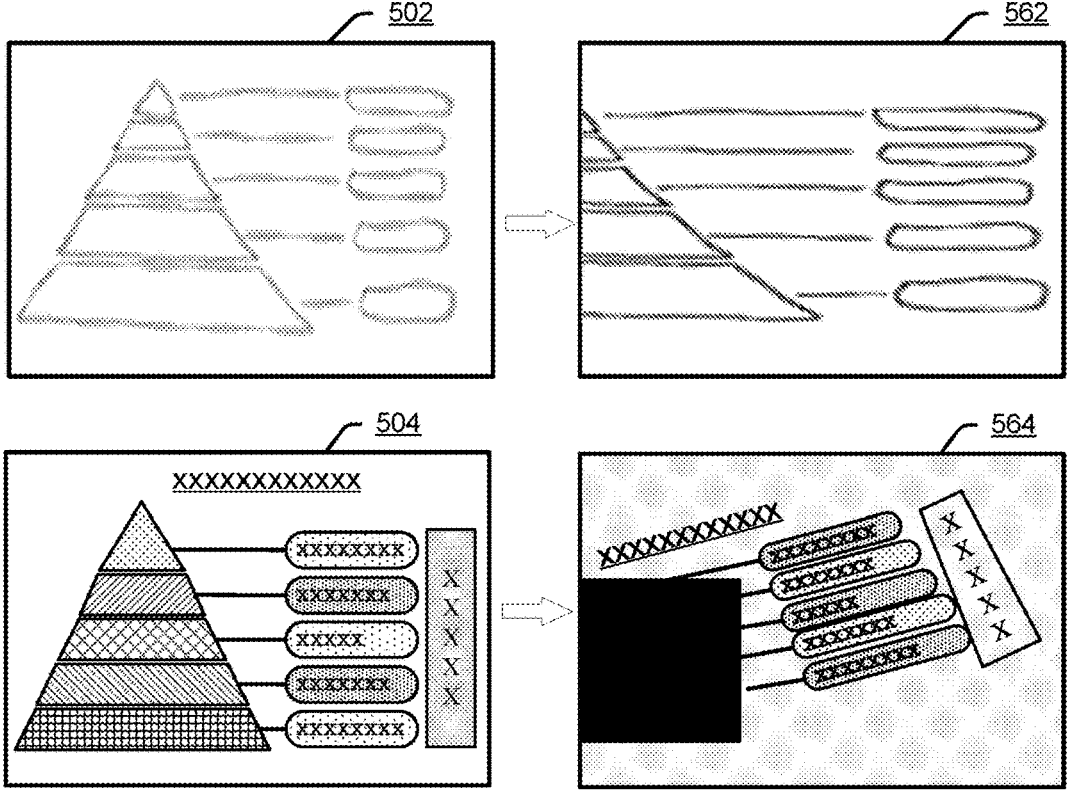

FIG. 5F illustrates an example of data augmentation combination. FIG. 5F still takes the hand-drawing shape sample 502 and the document page image sample 504 as examples. As shown in FIG. 5F, an augmented hand-drawing shape sample 562 is obtained by performing, e.g., random cropping and scaling, random color jittering, etc., to the hand-drawing shape sample 502, and an augmented document page image sample 564 is obtained by performing, e.g., random cropping and scaling, random perspective converting, random region erasing, color jittering, etc., to the document page image sample 504. In FIG. 5F, different data augmentation combinations are simultaneously performed to the hand-drawing shape sample and the document page image sample, respectively.

Figure 6A:
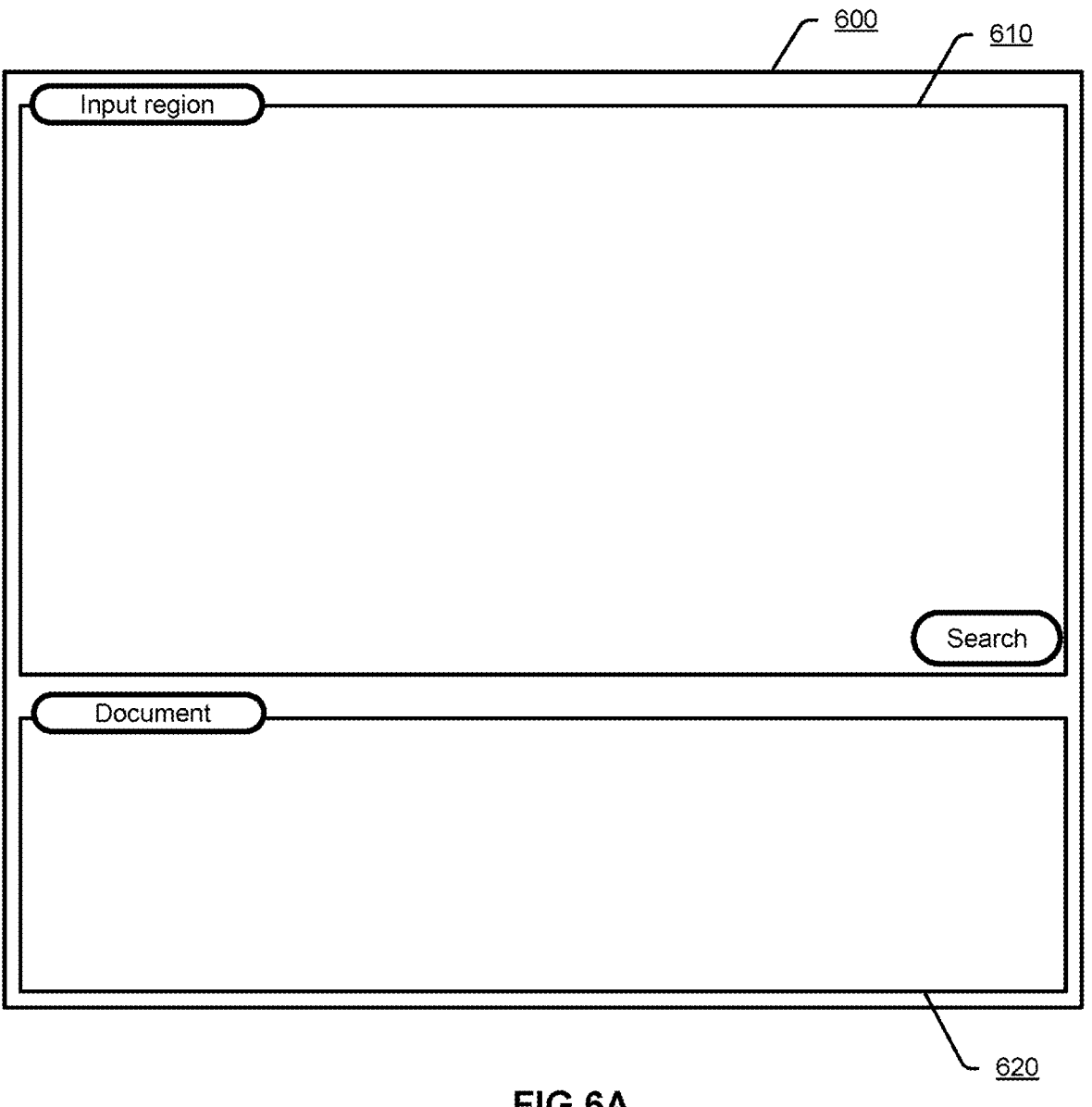
FIG. 6A to FIG. 6C illustrate an exemplary user interface according to an embodiment.
Figure 6B:
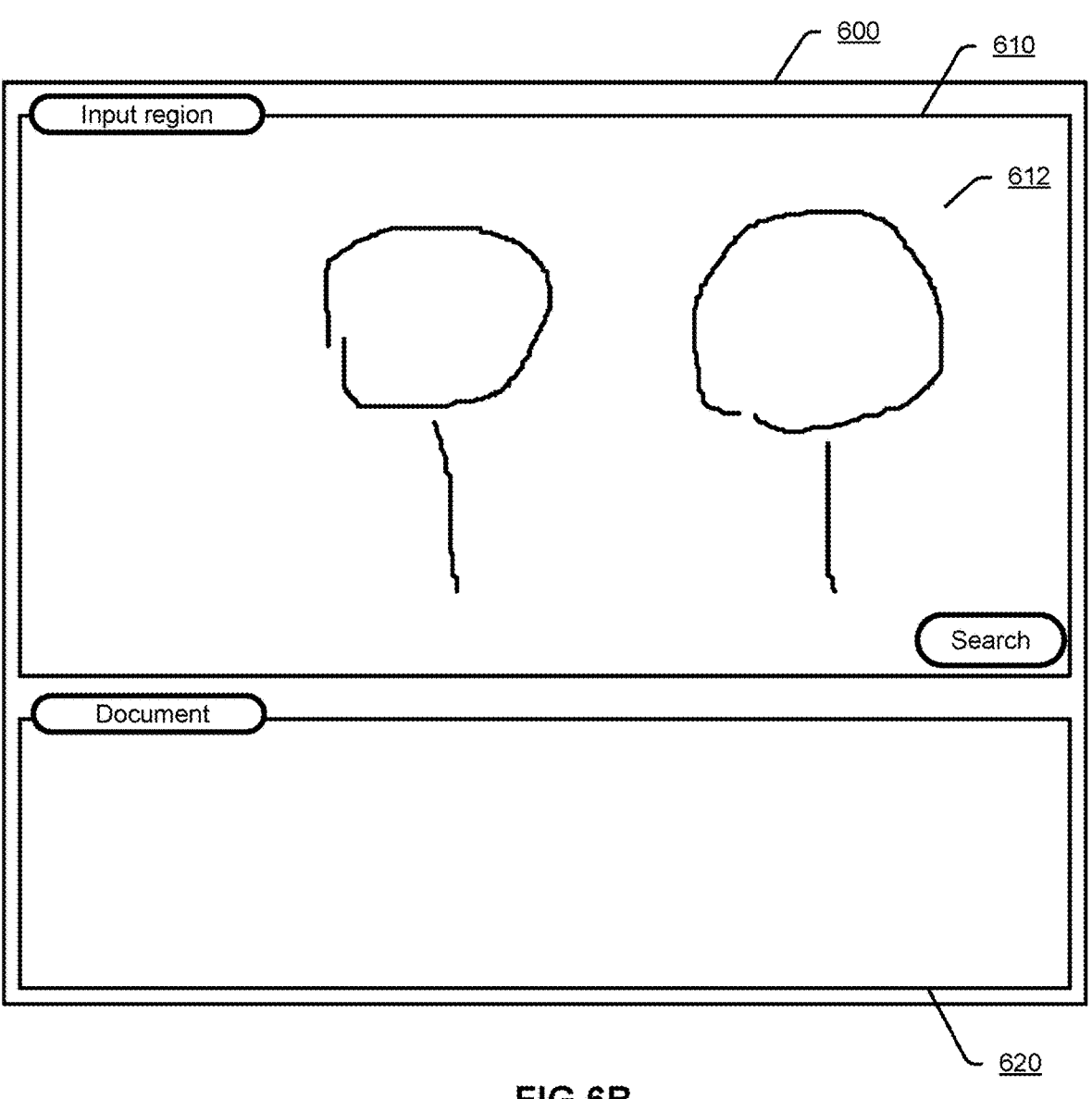
Figure 6C:
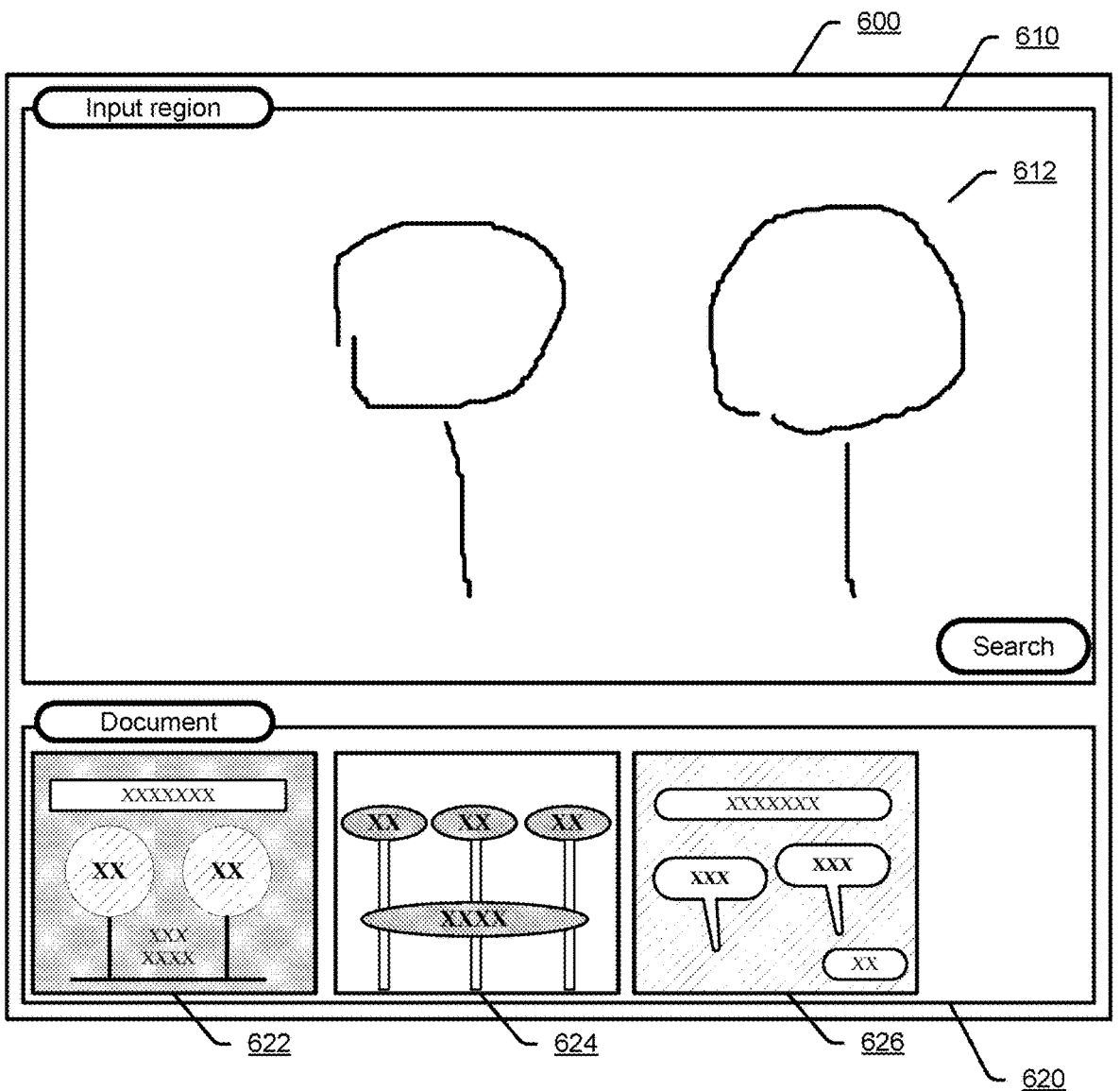

FIG. 6A to FIG. 6C illustrate an exemplary user interface 600 according to an embodiment. The user interface 600 may be presented in a smart device, so that a user may draw a hand-drawing shape and check a retrieval result through the user interface 600.

As shown in FIG. 6A, the user interface 600 may include a canvas 610, a retrieval result region 620, etc.

As shown in FIG. 6B, it is assumed that the user draws a hand-drawing shape 612 in the canvas 610 and clicks a "Search" button to indicate that the user wants to find a target document associated with the hand-drawing shape 612.

After at least one target document is determined according to the embodiments of the present disclosure, a retrieval result about the retrieved document pages or target documents may be presented in the retrieval result region 620. The embodiments of the present disclosure may indicate the retrieved document pages or target documents in various approaches in the retrieval result, e.g., displaying thumbnails or document page images of document pages locally matching the input hand-drawing shape, displaying names, storage paths or links of the target documents, etc. As an example, in FIG. 6C, the retrieval result presented in the retrieval result region 620 may include thumbnails 622, 624 and 626 of document pages locally matching the hand-drawing shape 612. Moreover, optionally, if the user clicks on a certain document page or target document indicated in the retrieval result, the embodiments of the present disclosure may further open the corresponding target document, e.g., calling an application associated with the target document to open the target document.

It should be understood that all the elements and their layouts in the user interface 600 in FIG. 6A to FIG. 6C are exemplary, and according to specific application scenarios and design requirements, the user interface may include more or less elements and adopt any other layout approaches. The embodiments of the present disclosure are not limited to any specific form of user interface. FIG. 7 illustrates a flowchart of an exemplary method 700 for hand-drawing shape-based document retrieval according to an embodiment.

At 710, an input hand-drawing shape may be obtained.

At 720, a hand-drawing shape feature of the hand-drawing shape may be extracted through a feature extracting model.

At 730, at least one target document may be retrieved by using the hand-drawing shape feature and a feature index library associated with a plurality of candidate documents, at least one document page in the target document locally matching the hand-drawing shape.

In an implementation, the method 700 may also comprise: preprocessing the hand-drawing shape, to scale the hand-drawing shape to a predetermined size. The extracting a hand-drawing shape feature may comprise: extracting the hand-drawing shape feature of the preprocessed hand-drawing shape.

In an implementation, the feature index library may comprise a plurality of data items respectively corresponding to a plurality of document page images. Each data item may at least comprise: a document page image feature extracted from a document page image corresponding to a document page in a candidate document; and an index of the document page image.

The retrieving at least one target document may comprise: calculating a similarity value between the hand-drawing shape feature and each document page image feature in the feature index library; ranking the plurality of document page images based on similarity values; and selecting at least one candidate document corresponding to at least one highest-ranked document page image, as the at least one target document.

In an implementation, the method 700 may further comprise: for each candidate document in the plurality of candidate documents, obtaining a group of document page images corresponding to the candidate document, each document page image in the group of document page images corresponding to a document page in a group of document pages included in the candidate document; and establishing, at least through the feature extracting model, the feature index library based on a plurality of groups of document page images respectively corresponding to the plurality of candidate documents.

The establishing the feature index library may comprise, for each document page image: extracting, through the feature extracting model, a document page image feature of the document page image; and storing the document page image feature and an index of the document page image together into the feature index library.

The method 700 may further comprise: preprocessing the document page image, to scale the document page image to a predetermined size. The extracting a document page image feature may comprise: extracting the document page image feature of the preprocessed document page image. In an implementation, the feature extracting model may be based on deep convolutional neural network.

In an implementation, the method 700 may further comprise: training the feature extracting model by using a training dataset which includes a group of training samples, each training sample at least comprising a hand-drawing shape sample, a document page image sample and a similarity label.

The method 700 may further comprise: performing data augmentation to at least one training sample in the training dataset, to randomly change a hand-drawing shape sample and a document page image sample in the training sample.

The data augmentation may comprise at least one of: random cropping and scaling; random region erasing; random perspective converting; and random color jittering.

In an implementation, the method 700 may further comprise: presenting a retrieval result about the document page and/or the target document.

In an implementation, the plurality of candidate documents may be productivity tool documents. In an implementation, the plurality of candidate documents may be personal documents of a user and/or public documents on the network.

It should be understood that the method 700 may further comprise any step/process for hand-drawing shape-based document retrieval according to the embodiments of the present disclosure as described above.

FIG. 8 illustrates an exemplary apparatus 800 for hand-drawing shape-based document retrieval according to an embodiment.

The apparatus 800 may comprise: a hand-drawing shape obtaining module 810, for obtaining an input hand-drawing shape; a feature extracting module 820, for extracting, through a feature extracting model, a hand-drawing shape feature of the hand-drawing shape; and a target document retrieving module 830, for retrieving at least one target document by using the hand-drawing shape feature and a feature index library associated with a plurality of candidate documents, at least one document page in the target document locally matching the hand-drawing shape.

Moreover, the apparatus 800 may further comprise any other module that is configured for performing any operation of the methods for hand-drawing shape-based document retrieval according to the embodiments of the disclosure as described above.

FIG. 9 illustrates an exemplary apparatus 900 for hand-drawing shape-based document retrieval according to an embodiment.

The apparatus 900 may comprise at least one processor 910. The apparatus 900 may further comprise a memory 920 connected with at least one processor 910. The memory 920 may store computer-executable instructions that, when executed, cause the at least one processor 910 to: obtain an input hand-drawing shape; extract, through a feature extracting model, a hand-drawing shape feature of the hand-drawing shape; and retrieve at least one target document by using the hand-drawing shape feature and a feature index library associated with a plurality of candidate documents, at least one document page in the target document locally matching the hand-drawing shape. Moreover, the at least one processor 910 may be further configured for performing any other operation of the methods for hand-drawing shape-based document retrieval according to the embodiments of the disclosure as described above.

The embodiments of the present disclosure propose a computer program product for hand-drawing shape-based document retrieval. The computer program product comprises a computer program that is executed by at least one processor for: obtaining an input hand-drawing shape; extracting, through a feature extracting model, a hand-drawing shape feature of the hand-drawing shape; and retrieving at least one target document by using the hand-drawing shape feature and a feature index library associated with a plurality of candidate documents, at least one document page in the target document locally matching the hand-drawing shape. Moreover, the computer program may be further executed by the at least one processor for performing any other operation of the methods for hand-drawing shape-based document retrieval according to the embodiments of the disclosure as described above.

The embodiments of the present disclosure may be embodied in a non-transitory computer-readable medium. The non-transitory computer readable medium may comprise instructions that, when executed, cause one or more processors to perform any step/process of the methods for hand-drawing shape-based document retrieval according to the embodiments of the disclosure as described above.

It should be appreciated that all the operations in the methods described above are merely exemplary, and the present disclosure is not limited to any operations in the methods or sequence orders of these operations, and should encompass all other equivalents under the same or similar concepts.

In addition, the articles "a" and "an" as used in this description and appended claims, unless otherwise specified or clear from the context that they are for the singular form, should generally be interpreted as meaning "one" or "one or more."

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a micro-processor, micro-controller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, micro-controller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

The invention claimed is:

1. A method for hand-drawing shape-based document retrieval, comprising:
obtaining an input arbitrary non-textual hand-drawing shape comprising at least one geometric or graphical element that is not a handwritten word or text;
extracting, through a feature extracting model without using word recognition or text-based processing, a hand-drawing shape feature of the hand-drawing shape;
preprocessing the hand-drawing shape, to scale the hand-drawing shape to a predetermined size; and
retrieving at least one target document by using the hand-drawing shape feature and a feature index library associated with a plurality of candidate documents, at least one document page in the target document locally matching the hand-drawing shape by comparing the hand-drawing shape feature to a document page image feature in a local region of the document page image, wherein the at least one target document is retrieved based on a match between the hand-drawing shape feature and a target document shape feature in the feature index library associated with the at least one document, and wherein the retrieval is performed without recognizing or transcribing any words or text in the input hand-drawing shape.

2. The method of claim 1, wherein the extracting a hand-drawing shape feature comprises: extracting the hand-drawing shape feature of the preprocessed hand-drawing shape.

3. The method of claim 1, wherein
the feature index library comprises a plurality of data items respectively corresponding to a plurality of document page images, and each data item at least comprises: a document page image feature extracted from a document page image corresponding to a document page in a candidate document; and an index of the document page image.

4. The method of claim 3, wherein the retrieving at least one target document comprises:
calculating a similarity value between the hand-drawing shape feature and each document page image feature in the feature index library;
ranking the plurality of document page images based on similarity values; and
selecting at least one candidate document corresponding to at least one highest-ranked document page image, as the at least one target document.

5. The method of claim 1, further comprising:
for each candidate document in the plurality of candidate documents, obtaining a group of document page images corresponding to the candidate document, each document page image in the group of document page images corresponding to a document page in a group of document pages included in the candidate document; and
establishing, at least through the feature extracting model, the feature index library based on a plurality of groups of document page images respectively corresponding to the plurality of candidate documents.

6. The method of claim 5, wherein the establishing the feature index library comprises, for each document page image:
extracting, through the feature extracting model, a document page image feature of the document page image; and
storing the document page image feature and an index of the document page image together into the feature index library.

7. The method of claim 6, further comprising:
preprocessing the document page image, to scale the document page image to a predetermined size,
wherein the extracting a document page image feature comprises: extracting the document page image feature of the preprocessed document page image.

8. The method of claim 1, wherein the feature extracting model is based on deep convolutional neural network.

9. The method of claim 1, further comprising:
training the feature extracting model by using a training dataset which includes a group of training samples, each training sample at least comprising a hand-drawing shape sample, a document page image sample and a similarity label.

10. The method of claim 9, further comprising:
performing data augmentation to at least one training sample in the training dataset, to randomly change a hand-drawing shape sample and a document page image sample in the training sample.

11. The method of claim 10, wherein the data augmentation comprises at least one of:
random cropping and scaling; random region erasing; random perspective converting; and
random color jittering.

12. The method of claim 1, further comprising:
presenting a retrieval result about the document page and/or the target document.

13. The method of claim 1, wherein
the plurality of candidate documents are personal documents of a user and/or public documents on a network.

14. An apparatus for hand-drawing shape-based document retrieval, comprising:
at least one processor; and
a memory storing computer-executable instructions that, when executed, cause the at least one processor to:
obtain an input arbitrary non-textual hand-drawing shape comprising at least one geometric or graphical element that is not a handwritten word or text;
extract, through a feature extracting model without using word recognition or text-based processing, a hand-drawing shape feature of the hand-drawing shape;
preprocess the hand-drawing shape, to scale the hand-drawing shape to a predetermined size; and
retrieve at least one target document by using the hand-drawing shape feature and a feature index library associated with a plurality of candidate documents, at least one document page in the target document locally matching the hand-drawing shape by comparing the hand-drawing shape feature to a document page image feature in a local region of the document page image, wherein the at least one target document is retrieved based on a match between the hand-drawing shape feature and a target document shape feature in the feature index library associated with the at least one document, and wherein the retrieval is performed without recognizing or transcribing any words or text in the input hand-drawing shape.

15. The apparatus of claim 14, wherein the instructions to extract a hand-drawing shape feature comprises instructions to extract the hand-drawing shape feature of the preprocessed hand-drawing shape.

16. The apparatus of claim 14, wherein the feature index library comprises a plurality of data items respectively corresponding to a plurality of document page images, and each data item at least comprises:

a document page image feature extracted from a document page image corresponding to a document page in a candidate document; and an index of the document page image.

17. At least one non-transitory machine-readable medium comprising instructions for hand-drawing shape-based document retrieval that, when executed by at least one processor, cause the at least one processor to:

obtain an input arbitrary non-textual hand-drawing shape comprising at least one geometric or graphical element that is not a handwritten word or text;

extract, through a feature extracting model without using word recognition or text-based processing, a hand-drawing shape feature of the hand-drawing shape;

preprocess the hand-drawing shape, to scale the hand-drawing shape to a predetermined size; and retrieve at least one target document by using the hand-drawing shape feature and a feature index library associated with a plurality of candidate documents, at least one document page in the target document locally matching the hand-drawing shape by comparing the hand-drawing shape feature to a document page image feature in a local region of the document page image, wherein the at least one target document is retrieved based on a match between the hand-drawing shape feature and a target document shape feature in the feature index library associated with the at least one document, and wherein the retrieval is performed without recognizing or transcribing any words or text in the input hand-drawing shape.

18. The at least one non-transitory machine-readable medium of claim 17, wherein the instructions to extract a hand-drawing shape feature comprises instructions to extract the hand-drawing shape feature of the preprocessed hand-drawing shape.

19. The at least one non-transitory machine-readable medium of claim 17, wherein the feature index library comprises a plurality of data items respectively corresponding to a plurality of document page images, and each data item at least comprises:

a document page image feature extracted from a document page image corresponding to a document page in a candidate document; and an index of the document page image.

20. The at least one non-transitory machine-readable medium of claim 17, further comprising instructions that cause the at least one processor to:

for each candidate document in the plurality of candidate documents, obtain a group of document page images corresponding to the candidate document, each document page image in the group of document page images corresponding to a document page in a group of document pages included in the candidate document; and establish, at least through the feature extracting model, the feature index library based on a plurality of groups of document page images respectively corresponding to the plurality of candidate documents.

* * * * *